US011208084B2

(12) United States Patent
Kamiya et al.

(10) Patent No.: US 11,208,084 B2
(45) Date of Patent: Dec. 28, 2021

(54) BRAKE ASSISTANCE APPARATUS AND BRAKE ASSISTANCE CONTROL METHOD FOR VEHICLE

(71) Applicant: DENSO CORPORATION, Kariya (JP)

(72) Inventors: Kei Kamiya, Kariya (JP); Yosuke Ito, Kariya (JP); Takaharu Oguri, Kariya (JP); Takahiro Baba, Kariya (JP); Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 52 days.

(21) Appl. No.: 16/737,070

(22) Filed: Jan. 8, 2020

(65) Prior Publication Data
US 2020/0139944 A1 May 7, 2020

Related U.S. Application Data

(63) Continuation of application No. PCT/JP2018/023128, filed on Jun. 18, 2018.

(30) Foreign Application Priority Data

Jul. 11, 2017 (JP) .............................. JP2017-135115

(51) Int. Cl.
B60T 7/22 (2006.01)
B60T 8/171 (2006.01)

(52) U.S. Cl.
CPC ................ B60T 7/22 (2013.01); B60T 8/171 (2013.01); B60T 2201/022 (2013.01)

(58) Field of Classification Search
CPC ...... B60T 7/22; B60T 8/171; B60T 2201/022; B60T 2201/083; G08G 1/16
See application file for complete search history.

(56) References Cited

U.S. PATENT DOCUMENTS

| 2016/0280134 A1* | 9/2016 | Miura ..................... B60Q 9/008 |
| 2017/0113683 A1* | 4/2017 | Mudalige ........ B60W 30/18145 |
| 2017/0210360 A1* | 7/2017 | Ito ........................ B60R 21/0134 |
| 2018/0144633 A1* | 5/2018 | Minemura ............. G08G 1/166 |
| 2018/0203454 A1* | 7/2018 | Aoki ................. B60W 50/0097 |

FOREIGN PATENT DOCUMENTS

| JP | 2009-166764 A | 7/2009 |
| JP | 2010-280271 A | 12/2010 |

* cited by examiner

Primary Examiner — Thomas Ingram
(74) Attorney, Agent, or Firm — Maschoff Brennan

(57) ABSTRACT

A brake assistance apparatus for a vehicle is provided. The brake assistance apparatus includes a detecting unit and a brake assistance control unit. The detecting unit detects a state surrounding an own vehicle. The brake assistance control unit performs brake assistance to brake the own vehicle at a first brake timing, based on the detected state surrounding the own vehicle. In response to the own vehicle being determined to be advancing at an intersection based on the detected state surrounding the own vehicle, the brake assistance control unit performs the brake assistance at a second brake timing that is later than the first brake timing.

10 Claims, 5 Drawing Sheets

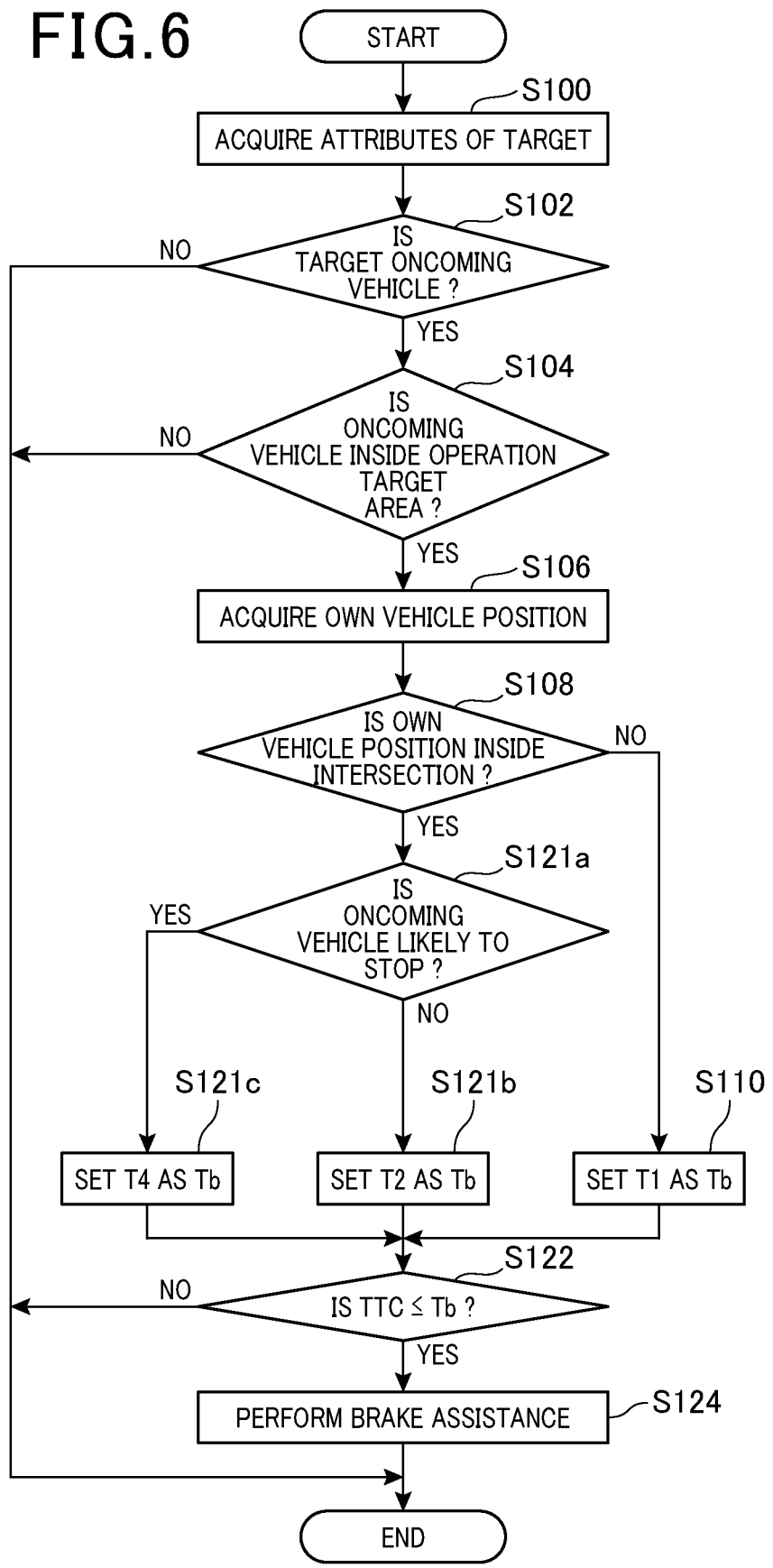

BRAKE ASSISTANCE APPARATUS AND BRAKE ASSISTANCE CONTROL METHOD FOR VEHICLE

CROSS-REFERENCE TO RELATED APPLICATIONS

The present application is a continuation application of International Application No. PCT/JP2018/023128, filed Jun. 18, 2018, which claims priority to Japanese Patent Application No. 2017-135115, filed Jul. 11, 2017. The contents of these applications are incorporated herein by reference in their entirety.

BACKGROUND

Technical Field

The present disclosure relates to a brake assistance apparatus and a brake assistance control method for a vehicle.

Related Art

Contact avoidance technology is being put to practical use. This technology avoids contact and collision with a target such as another vehicle or an obstacle that is present ahead of an own vehicle, based on a detection result from a target detector such as a camera or a radar. The contact avoidance technology also includes brake assistance technology in which brake assistance of a vehicle is performed based on the detection result.

SUMMARY

The present disclosure provides a brake assistance apparatus for a vehicle. The brake assistance apparatus includes a detecting unit. The detecting unit detects a state surrounding an own vehicle. The brake assistance assistance performs brake assistance to brake the own vehicle at a first brake timing, based on the detected state surrounding the own vehicle. In response to the own vehicle being determined to be advancing at an intersection based on the detected state surrounding the own vehicle, the brake assistance assistance performs the brake assistance at a second brake timing that is later than the first brake timing.

BRIEF DESCRIPTION OF THE DRAWINGS

In the accompanying drawings:

FIG. 6 is a flowchart of a flow of processes in brake assistance control performed by a brake assistance apparatus according to a second embodiment.

DESCRIPTION OF THE EMBODIMENTS

Figure 1:
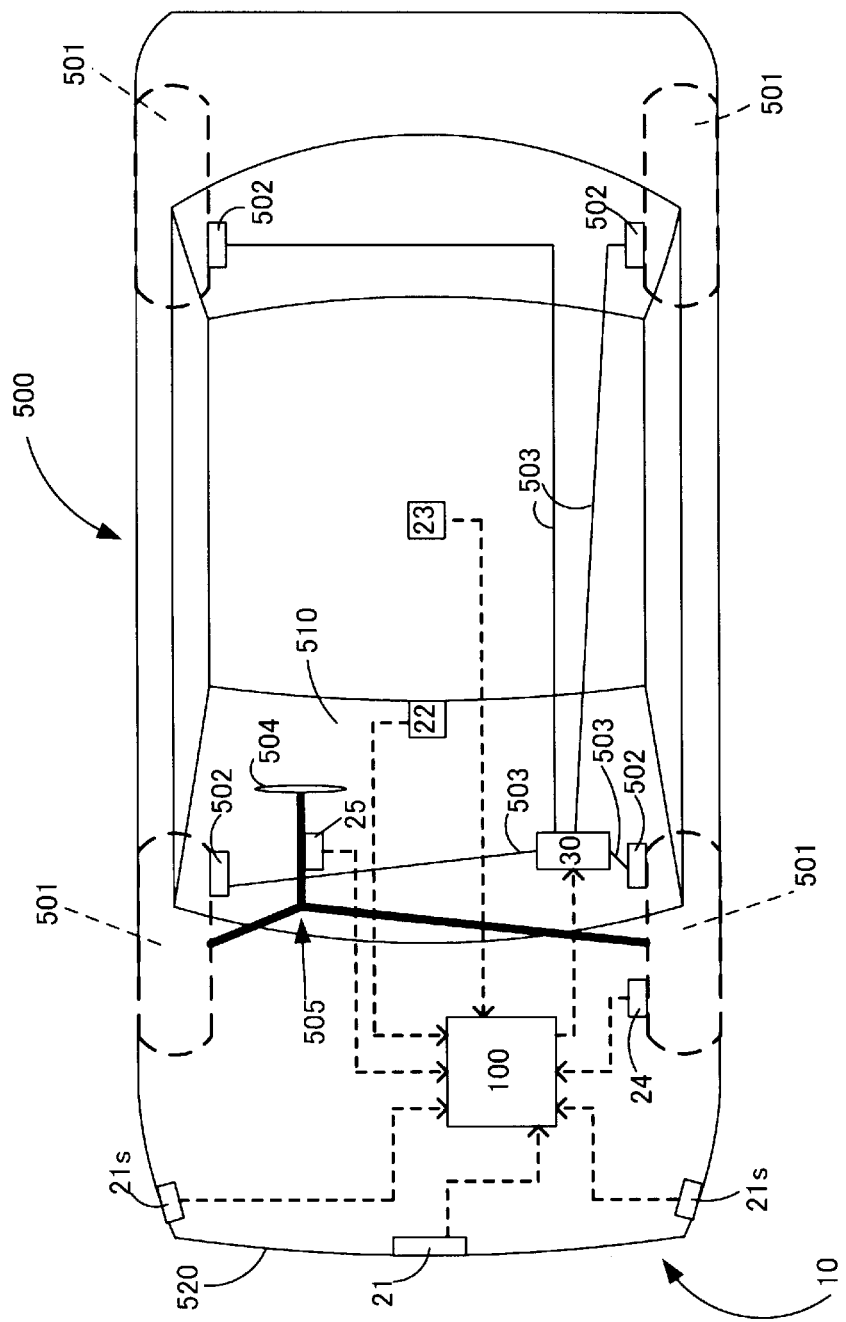
FIG. 1 is an explanatory diagram of a vehicle to which a brake assistance apparatus according to a first embodiment is mounted.

Brake assistance in which the own vehicle is stopped by a lit color of a traffic light or a stop line being identified, and brake assistance in which the own vehicle is stopped to avoid or mitigate contact or collision with another vehicle that is opposing the own vehicle at an intersection or in a right-turn lane in a country that drives on the left-hand side of the road have been proposed (for example, JP-A-2009-166764 and JP-A-2010-280271).

However, at an intersection, compared to roads other than the intersection, a probability of an encounter with another vehicle that is advancing so as to intersect an advancing traffic lane of the own vehicle, that is, advancing so as to make a turn increases. Situations requiring avoidance of contact or collision between the own vehicle and the other vehicle that is advancing so as to make a turn, or mitigation of effects resulting from contact or collision also increase. Meanwhile, when the frequency of brake assistance increases taking into consideration of increasing contact and collision with another vehicle, opportunities for deceleration and stopping of the own vehicle in accompaniment with brake assistance increase. In addition to a passenger of the own vehicle experiencing discomfort, smooth advancing of the vehicle at an intersection is inhibited.

It is thus desired to improve accuracy in avoiding contact or collision between an own vehicle that is advancing straight ahead at an intersection and another vehicle, and accuracy in mitigating effects that accompany collision and contact.

A first exemplary embodiment provides a brake assistance apparatus for a vehicle. The brake assistance apparatus for a vehicle according to the first aspect includes a detecting unit and a brake assistance control unit. The detecting unit detects a state surrounding an own vehicle. The brake assistance control unit performs brake assistance to perform braking assistance at a first brake timing, based on the detected state surrounding the own vehicle. In response to the own vehicle being determined to be advancing at an intersection based on the detected state surrounding the own vehicle, the brake assistance control unit performs the brake assistance at a second brake timing that is later than the first brake timing.

As a result of the brake assistance apparatus for a vehicle according to the first exemplary embodiment, when the state surrounding the own vehicle is detected, brake assistance is performed at the first timing based on the detected state. When the own vehicle is determined to be advancing at an intersection through use of the state, brake assistance is performed at a second brake timing that is later than the first brake timing.

Therefore, accuracy regarding the avoidance of contact or collision between the own vehicle that is advancing straight ahead at an intersection and another vehicle, and accuracy in mitigating the effects that accompany collision or contact can be improved.

A second exemplary embodiment provides a brake assistance control method for a vehicle. In the brake assistance control method, a state surrounding an own vehicle is detected. Braking assistance is performed to brake the own vehicle. Based on the detected state surrounding the own vehicle, braking assistance is performed at a first brake timing. When the own vehicle is determined to be advancing at an intersection based on the detected state surrounding the own vehicle, brake assistance is performed at a second brake timing that is later than the first brake timing.

As a result of the brake assistance control method for a vehicle according to the second exemplary embodiment, the state surrounding the own vehicle is detected. Based on the detected state surrounding the own vehicle, brake assistance is performed at the first brake timing. When the own vehicle is determined to be advancing at an intersection based on the detected state surrounding the own vehicle, brake assistance is performed at a second brake timing that is later than the first brake timing.

Therefore, accuracy regarding the avoidance of contact or collision between the own vehicle that is advancing straight ahead at an intersection and another vehicle, and accuracy in mitigating the effects that accompany collision or contact can be improved. Here, the present disclosure can also be actualized as a brake assistance control program for a vehicle or a computer-readable recording medium in which the program is recorded.

A brake assistance apparatus for a vehicle and a brake assistance control method for a vehicle of the present disclosure will hereinafter be described according to several embodiments.

First Embodiment

As shown in FIG. 1, a brake assistance apparatus 10 according to a first embodiment is mounted to a vehicle 500. The brake assistance apparatus 10 includes a control apparatus 100, millimeter-wave radars 21 and 21s, a monocular camera 22, a yaw rate sensor 23, a wheel speed sensor 24, a steering angle sensor 25, and a brake assistance actuator 30. The vehicle 500 includes a wheel 501, a brake apparatus 502, a brake line 503, a steering wheel 504, a front windshield 510, and a front bumper 520.

Here, as a detecting unit for detecting a state surrounding an own vehicle, the vehicle is merely required to include at least the monocular camera 22 among the millimeter-wave radars 21 and 21s, the monocular camera 22, and a LIDAR (laser radar). According to the present embodiment, the vehicle includes the millimeter-wave radars 21 and 21s, and the monocular camera 22 as the detecting unit. According to the present embodiment, the state surrounding the own vehicle is a state that includes road environment, such as intersections, traffic lights, road signs, and road shape, and a traveling state of another vehicle.

In the vehicle 500, the brake apparatus 502 is provided in each wheel 501. Each brake apparatus 502 actualizes braking of the wheel 501 by brake fluid pressure that is supplied through the brake line 503 based on a brake pedal operation by a driver. The brake line 503 includes a brake piston that generates the brake fluid pressure based on the brake pedal operation and a brake fluid line.

According to the present embodiment, the brake assistance actuator 30 is provided on the brake line 503. Fluid pressure control can be performed independent of the brake pedal operation and brake assistance thereby actualized. Here, a configuration in which, instead of the brake fluid line, a control signal line is used as the brake line 503 and an actuator that is provided in each brake apparatus 502 is operated, or brake-by-wire, may be used. The steering wheel 504 is connected to the wheels 501 on a front side by a steering mechanism 505 that includes a steering rod.

Figure 2:
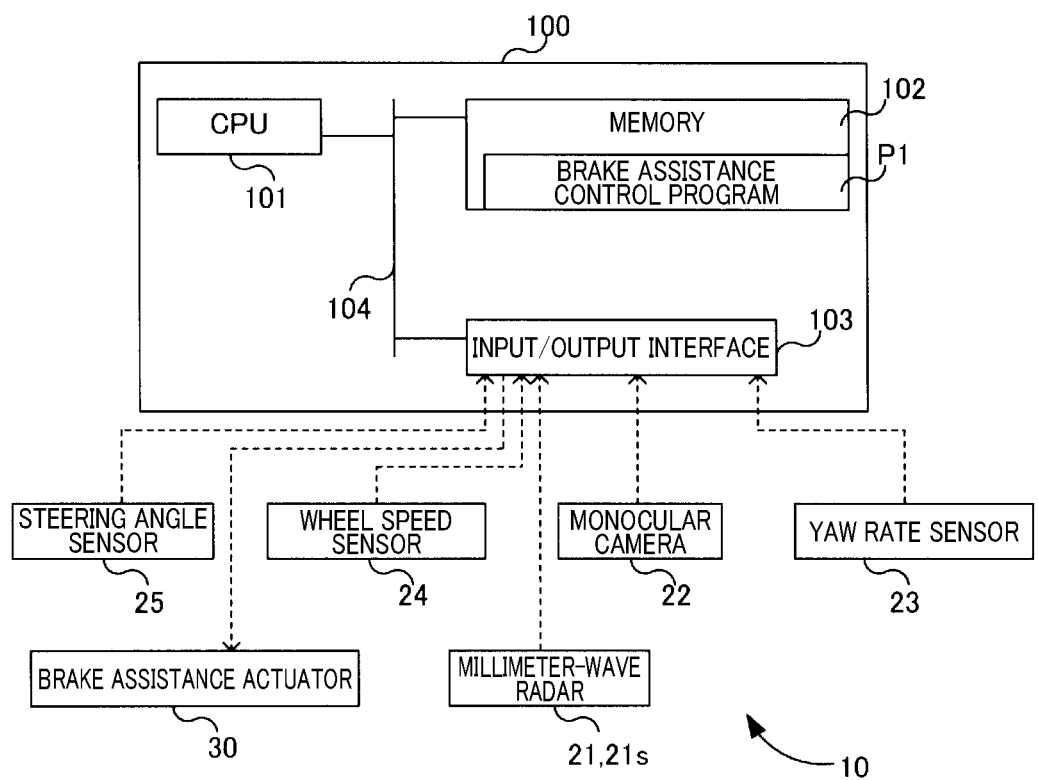
FIG. 2 is a block diagram of a functional configuration of a control apparatus that is provided in the brake assistance apparatus according to the first embodiment.

As shown in FIG. 2, the control apparatus 100 includes a central processing unit (CPU) 101, a memory 102, an input/output interface 103, and a bus 104. The CPU 101, the memory 102, and the input/output interface 103 are connected by a bus 104 so as to be capable of two-way communication.

The memory 102 includes a memory, such as a read-only memory (ROM), that stores therein a brake assistance control program P1 in a non-volatile and read-only manner. The brake assistance control program P1 is provided for execution of braking assistance by the brake apparatus 502. The memory 102 also includes a memory, such as a random access memory (RAM), that is readable and writable by the CPU 101.

The CPU 101 functions as a brake assistance control unit by expanding and running the brake assistance control program P1 stored in the memory 102 in a readable and writable memory. Here, the brake assistance control unit may include the brake assistance actuator 30 that applies the brake fluid pressure for brake assistance to the brake line 503 upon receiving a control signal from the CPU 101.

In addition, the brake assistance control unit may be divided into the CPU 101 that serves as a control unit that runs the brake assistance control program P1 for controlling the execution of brake assistance and transmits the control signal to each actuator, and the brake assistance actuator 30 that serves as a driving unit that drives the brake apparatus 502 for brake assistance. The CPU 101 may be a single CPU or may be a plurality of CPUs that run each program. Alternatively, the CPU 101 may be multithread-type CPU that is capable of simultaneously running a plurality of programs.

The input/output interface 103 is connected to each of the millimeter-wave radars 21 and 21s, the monocular camera 22, the yaw rate sensor 23, the wheel speed sensor 24, the steering angle sensor 25, and the brake assistance actuator 30 by a control signal line. Detection information is inputted from the millimeter-wave radars 21 and 21s, the monocular camera 22, the yaw rate sensor 23, the wheel speed sensor 24, and the steering angle sensor 25. A control signal that designates a brake level is outputted to the brake assistance actuator 30.

The millimeter-wave radars 21 and 21s are sensors that emit millimeter waves and receive reflected waves that are reflected by a target, thereby detecting distance, relative speed, and angle of the target. According to the present embodiment, the millimeter-wave radar 21 is arranged in a center of the front bumper 502. Two millimeter-wave radars 21s are respectively arranged on both side surfaces of the front bumper 520.

For example, detection signals outputted from the millimeter-wave radars 21 and 21s may be signals that are composed of a point or a series of points that indicate a single or a plurality of representative positions of a target, obtained by received waves being processed in a processing circuit provided in the millimeter-wave radars 21 and 21s. Alternatively, the detection signals may be signals that indicate unprocessed received waves. When the unprocessed received waves are used as the detection signals, signal processing to identify the position and distance of the target is performed in the control apparatus 100. Here, a LIDAR may be used instead of the millimeter-wave radar.

The monocular camera 22 is an imaging apparatus that includes a single image sensor, such as a charge coupled device (CCD). The monocular camera 22 is a sensor that outputs, as image data that is a detection result, outer appearance information on a target by receiving visible light. The image data outputted from the monocular camera 22 is configured by a plurality of frame images that are continuous in time series. Each frame image is expressed by pixel data. According to the present embodiment, the monocular camera 22 is arranged in an upper center portion of the front windshield 510. The pixel data outputted from the monocular camera 22 is monochromic pixel data or color pixel data. Here, a compound-eye stereo camera may be used instead of the monocular camera 22.

The yaw rate sensor 23 is a sensor that detects a rotation angle speed of the vehicle 500. For example, the yaw rate sensor 23 is arranged in a center portion of the vehicle. A detection signal outputted from the yaw rate sensor 23 is a voltage value that is proportional to a rotation direction and an angular speed.

The wheel speed sensor 24 is a sensor that detects a rotation speed of the wheel 501. The wheel speed sensor 24 is provided in each wheel 501. A detection signal outputted from the wheel speed sensor 24 is a voltage value that is proportional to a wheel speed or a pulse wave that indicates an interval based on the wheel speed. Information such as vehicle speed and traveling distance of the vehicle can be acquired through use of the detection signal from the wheel speed sensor 24.

The steering angle sensor 25 is a torque sensor that detects a torsion amount that is generated in the steering rod as a result of steering of the steering wheel 504, that is, steering torque. According to the present embodiment, the steering angle sensor 25 is provided in the steering rod that connects the steering wheel 504 and the steering mechanism. A detection signal outputted from the steering sensor 25 is a voltage value that is proportional to the torsion amount.

The brake assistance actuator 30 is an actuator for actualizing braking by the brake apparatus 502 regardless of the brake pedal operation by the driver. In the brake assistance actuator 30, a driver that controls operation of the actuator based on a control signal from the CPU 101 is mounted. According to the present embodiment, the brake assistance actuator 30 is provided on the brake line 503. The brake assistance actuator 30 increases and decreases the brake fluid pressure on the brake line 503 based on a control signal from the control apparatus 100. For example, the brake assistance actuator 30 is composed of a module that includes an electric motor and a brake fluid pressure piston that is driven by the electric motor. Alternatively, a brake control actuator that is already introduced as an anti-skidding apparatus or an anti-lock brake system may be used.

Figure 3:
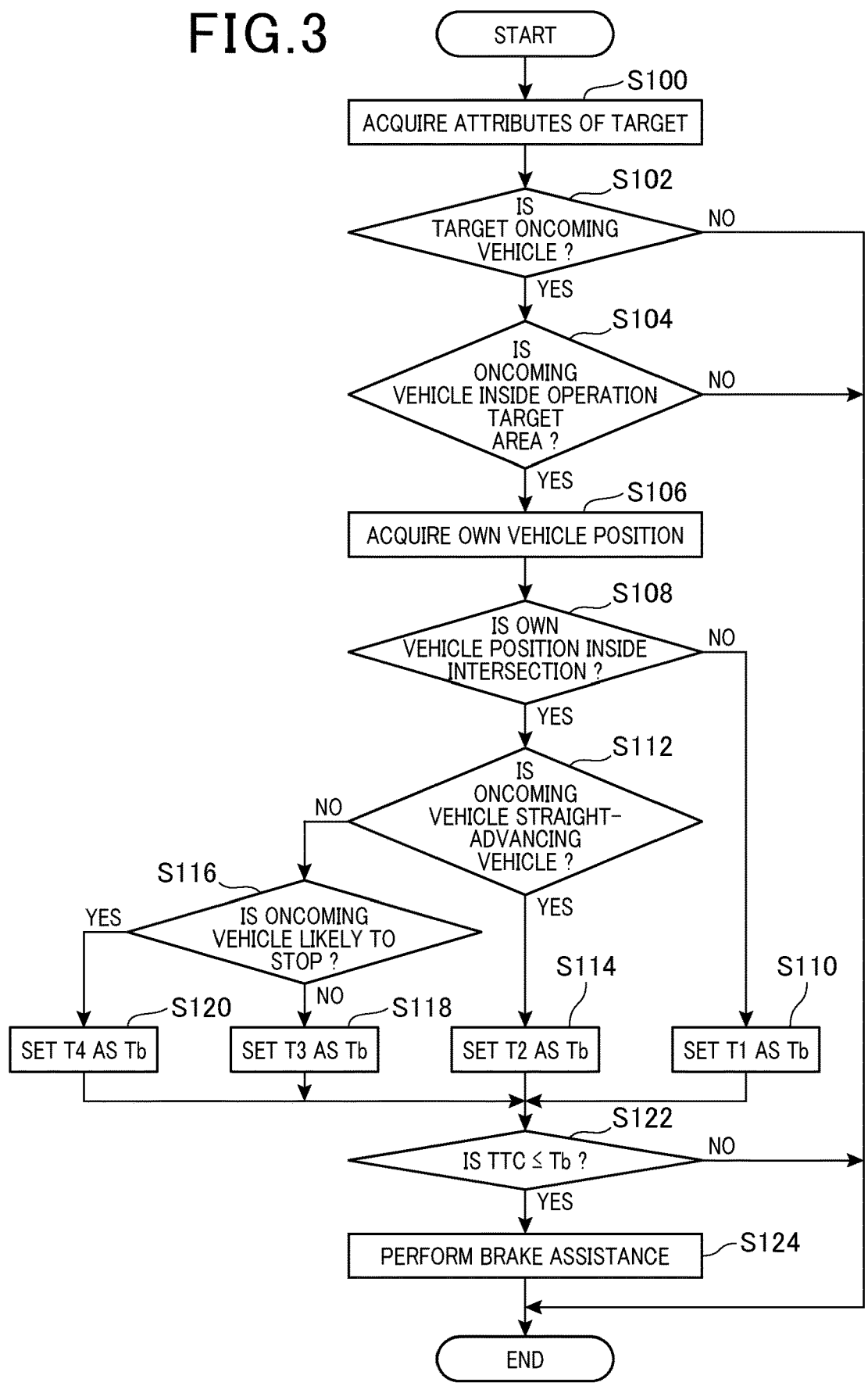
FIG. 3 is a flowchart of a flow of processes in brake assistance control performed by the brake assistance apparatus according to the first embodiment.
Figure 4:
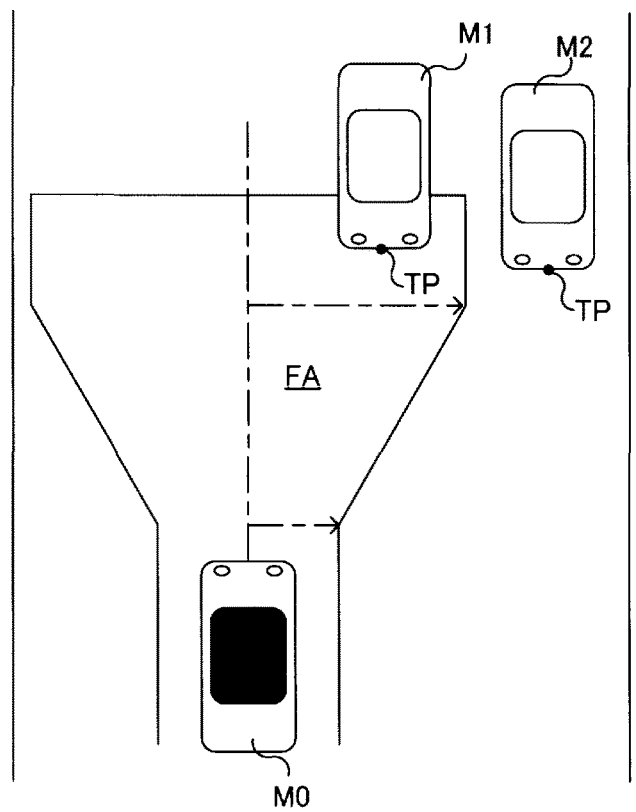
FIG. 4 is an explanatory diagram for explaining an operation target area used according to the first embodiment.

A brake assistance process that is performed by the brake assistance apparatus 10 according to the first embodiment will be described with reference to FIG. 3 to FIG. 5. For example, a processing routine shown in FIG. 3 is repeatedly performed by the CPU 101 running the brake assistance control program P1, at a predetermined time interval from when a control system of the vehicle is started until when the control system is stopped or from when a start switch is turned on until the start switch is turned off. A state shown in FIG. 4 is described below as an example.

The CPU 101 acquires attributes of a target using the detection results that are inputted from the detecting unit, such as the millimeter-wave radars 21 and 21s and the monocular camera 22 (step S100). The CPU 101 determines whether the target is an oncoming vehicle using the acquired attributes (step S102).

According to the present embodiment, as the attributes, for example, a distance from an own vehicle M0 to the target, a relative speed of the target relative to the own vehicle M0, an orientation of the target, an overlap ratio of the own vehicle and the target, and a collision predicted time or a collision margin time (time-to-collision [TTC]) until collision with the target are calculated and acquired through use of the detection results from the millimeter-wave radars 21 and 21s.

For example, a relative position of the target relative to the own vehicle M0, and shape and size of the target are calculated and acquired through use of the image data from the monocular camera 22. The CPU 101 determines whether the target is an oncoming vehicle using, for example, the relative speed and the shape and size of the target among the acquired attributes. In the example shown in FIG. 4, oncoming vehicles M1 and M2 are detected as targets. According to the present embodiment, an oncoming vehicle refers to a vehicle that is advancing in a direction opposing the own vehicle M0.

When determined that the target is not an oncoming vehicle (NO at step S102), the CPU 101 ends the present processing routine and starts the present processing routine at a next execution timing. For example, a target that is not an oncoming vehicle is a stationary object on a road or on the side of a road, such as a median strip, a guardrail, or a curbstone. For example, these targets can be determined to not be an oncoming vehicle based on the relative speed or the shape and size, in a manner easily understood by a person skilled in the art.

When determined that the target is an oncoming vehicle (YES at step S102), the CPU 101 determines whether the oncoming vehicles M1 and M2 are present inside an operation target area FA in which brake assistance is to be performed (step S104). As shown in FIG. 4, the operation target area FA is an area that spreads in the advancing direction of the own vehicle M0 and a width direction that is orthogonal to the advancing direction. The operation target area FA refers to an area in which a target that is likely to collide or come into contact with the own vehicle M0 is present.

For example, when the advancing direction of the own vehicle M0 is a Y-axis and a width direction of the own vehicle M0, that is, a lateral direction is an X-axis, a distance of the operation target area FA in the Y-axis direction is prescribed by the TTC until collision with the oncoming vehicle. The distance of the operation target area FA in the X-axis direction is prescribed so as to spread in the lateral direction farther from the own vehicle M0. The TTC (s) is calculated by TTC=DL/v using movement distance DL (km) and own vehicle speed v (km/h). The distance of the operation target area FA in the Y-axis direction is a distance that is variable based on the speed v of the own vehicle M0 as a result of the TTC being prescribed.

Meanwhile, regarding the distance of the operation target area FA in the X-axis direction, movement of the oncoming vehicle is less easily predicted with accuracy as the oncoming vehicle is farther from the own vehicle M0. Therefore, the oncoming vehicle is set as a monitoring target or an avoidance target with margin in the lateral direction farther from the own vehicle M0. Effectiveness of collision avoidance and contact avoidance is thereby improved.

Here, the distance in the lateral direction may be a fixed distance when the distance from the own vehicle M0 in the Y-axis direction exceeds a distance that is prescribed in advance, so as to achieve balance between suppression of increase in the oncoming vehicles that are to become monitoring targets and the effectiveness of collision avoidance. In the example in FIG. 4, the oncoming vehicle M1 is present in the operation target area FA. The oncoming vehicle M2 is not present in the operation target area FA.

An example of a method for determining whether the oncoming vehicles M1 and M2 are present in the operation target area FA will be described. The CPU 101 determines whether the oncoming vehicles M1 and M2 are present within a range of the operation target area FA the X-axis direction using X-coordinates of coordinates of detection points TP that correspond to the center of a vehicle front surface in a width direction of the oncoming vehicles M1 and M2 that are inputted from the millimeter-wave radars 21 and 21s, and an X-coordinate of the coordinates of the center of the vehicle front surface in the width direction of the own vehicle M0.

That is, whether a difference distance between the X-coordinate of the center of the vehicle front surface in the width direction of the own vehicle M0 and the X-coordinate of the detection point is equal to or less than the distance of the operation target area FA in the X-axis direction that is prescribed in advance is determined.

Here, to improve accuracy, the CPU 101 may overlap a coordinate position of the detection point TP that is inputted from the millimeter-wave radars 21 and 21s onto a front surface area of a vehicle that is extracted from the image data that is inputted from the monocular camera 22 by a data fusion process. When a plurality of detection points are inputted from the millimeter-wave radars 21 and 21s, as a result of the coordinate value of each detection point being overlapped onto the front surface area of the vehicle that is extracted from the image data, coordinates of nearest end portions of the oncoming vehicles M1 and M2 relative to the own vehicle M0 may be determined.

Whether the oncoming vehicles M1 and M2 are present in the operation target area FA may be determined through use of a distance between the coordinate of the nearest end portion and a coordinate of an end portion of the own vehicle in the width direction that is nearest to the oncoming vehicle. The nearest end portion is an end portion of the oncoming vehicles M1 and M2 that is at a nearest distance to the own vehicle M0.

When driving is performed on the left-hand side of the road, a front right end portion of the oncoming vehicles M1 and M2 corresponds to the nearest end portion. When driving is performed on the right-hand side of the road, a front left end portion of the oncoming vehicles M1 and M2 corresponds to the nearest end portion. Here, according to the present embodiment, driving on the left-hand side of the road is described as an example to simplify the description.

When determined that the oncoming vehicles M1 and M2 are not present inside the operation target area FA (No at step S104), the CPU 101 ends the present processing routine and starts the present processing routine at the next execution timing. When determined that the oncoming vehicles M1 and M2 are present inside the operation target area FA (Yes at step S104), the CPU 101 acquires an own vehicle position (step S106) and determines whether the own vehicle M0 is present inside an intersection (step S108).

Figure 5:
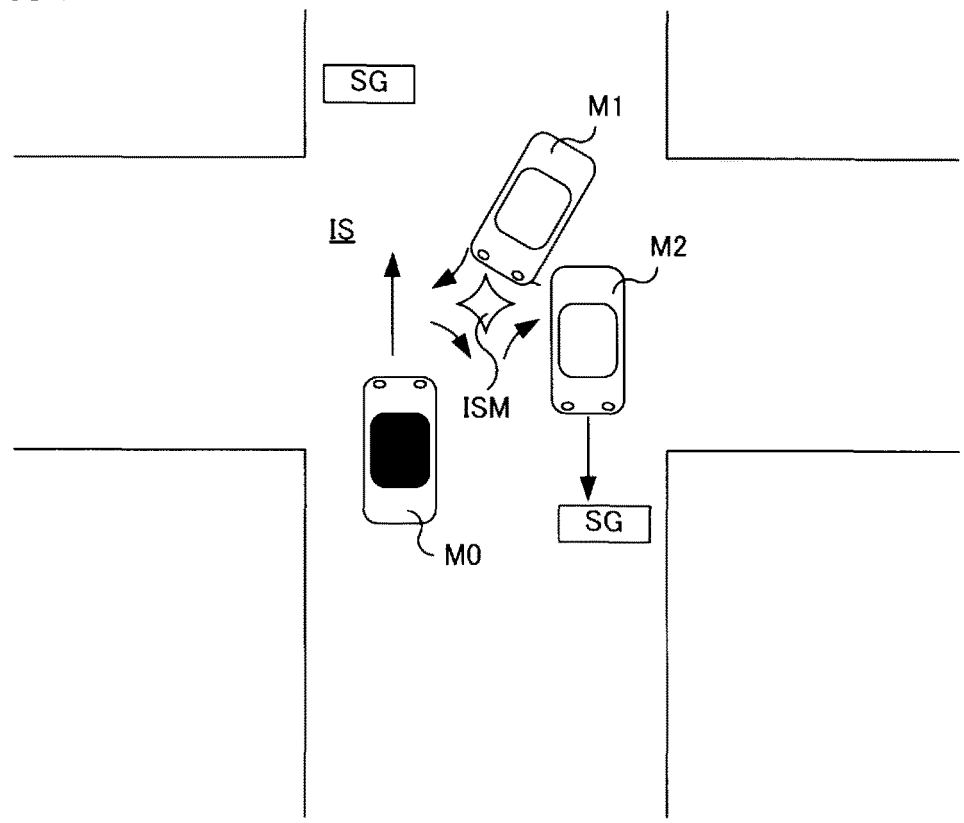
FIG. 5 is an explanatory diagram schematically showing a positional relationship between an own vehicle and oncoming vehicles within an intersection, according to the first embodiment.

Specifically, the CPU 101 determines whether the position of the own vehicle M0 is inside an intersection IS as shown in FIG. 5, using the detection results from the millimeter-wave radars 21 and 21s and the monocular camera 22. For example, whether the own vehicle M0 is present inside the intersection IS can be determined through use of a traffic light SG and an intersection sign ISM on the road that are detected by the monocular camera 22, and further, through use of the road shape that is detected by the millimeter-wave radars 21 and 21s. In addition, entry into an intersection may be determined through use of information from a light beacon, or map information in a global positioning system (GPS) and a navigation system.

When determined that the own vehicle M0 is not present inside the intersection IS (No at step S108), the CPU 101 sets a first threshold T1 (s) that indicates a first brake timing as a determination threshold Tb for the collision predicted time TTC (step S110) and proceeds to step S122. The brake timing is a timing at which brake assistance is started. The first threshold T1 prescribes a timing at which execution of brake assistance is started for the avoidance of collision with a target or the mitigation of damage due to contact, when the own vehicle M0 is traveling on a road other than an intersection. Here, according to the present embodiment, brake assistance also includes cases in which the speed of the own vehicle M0 is to be decelerated, in addition to cases in which the own vehicle M0 is completely stopped (speed per hour: 0 km/h).

When determined that the own vehicle M0 is present inside the intersection IS (Yes at step S108), the CPU 101 determines whether the oncoming vehicles M1 and M2 are straight-advancing vehicles. In the example in FIG. 5, the oncoming vehicle M1 corresponds to a turning vehicle. The oncoming vehicle M2 corresponds to a straight-advancing vehicle. For example, whether the oncoming vehicles M1 and M2 are straight-advancing vehicles can be determined by the orientations of the oncoming vehicles M1 and M2 being detected.

Specifically, the CPU 101 identifies the coordinate values that correspond to the vehicle front surface of the oncoming vehicle using the detection point inputted from the millimeter-wave radars 21 and 21s, and a lateral-width dimension of the vehicle front surface based on the distance from the own vehicle M0 that is provided in advance. When a detection point that corresponds to a vehicle side surface that exceeds a lateral width of a vehicle front surface that is identified in the X-axis direction is present, the CPU 101 identifies a detection point of which a coordinate value in a vertical direction, that is, the Y-axis direction is less than a coordinate value that corresponds to an overall length dimension of the vehicle that is provided in advance.

The CPU 101 identifies the orientations of the oncoming vehicles M1 and M2 based on a tilt of a straight line that connects a coordinate value of an end point of the lateral width of the vehicle front surface and a coordinate value of the detection point that corresponds to the vehicle side surface. In addition, the CPU 101 may identify the orientations of the oncoming vehicles M1 and M2 using the coordinate values of the detection points by overlapping the coordinate position of each detection point that is inputted from the millimeter-wave radars 21 and 21s onto the front surface area and a side surface area of the vehicle that are extracted from the image data that is inputted from the monocular camera 22 by a data fusion process.

When determined that the oncoming vehicle M2 is a straight-advancing vehicle (Yes at step S112), the CPU 101 sets a second threshold T2 (s) that indicates a second brake timing as the determination threshold Tb (step S114) and proceeds to step S122. The second brake timing is a brake timing that is later than the first brake timing, that is, a brake timing of which a brake start timing is later in terms of time than the first brake timing. When the own vehicle M0 is advancing inside the intersection IS, the own vehicle M0 is more likely to approach the oncoming vehicles M1 and M2 than when the own vehicle M0 is traveling on a road other than the intersection.

In addition, the vehicle speeds of the oncoming vehicles M1 and M2 that approach the own vehicle M0 tend to be low. Therefore, as a result of the start timing for brake assistance being delayed, the execution of brake assistance is suppressed. Reduction of discomfort experienced by the passenger is achieved. The second threshold T2 that corresponds to the second brake timing has a relationship T2<T1 with the first threshold T1. Here, instead of the setting of the second threshold T2, a setting in which brake assistance itself is not performed may be made.

When determined that the oncoming vehicle M1 is not a straight-advancing vehicle (No at step S12), the CPU 101 determines that the oncoming vehicle M1 is a turning vehicle and determines whether the oncoming vehicle M1 is likely to stop (step S116). When determined that the oncoming vehicle M1 is not a straight-advancing vehicle, the oncoming vehicle M1 is determined to be a turning vehicle. Here, whether the oncoming vehicle is a straight-advancing vehicle or a turning vehicle may be determined through use of the positions of the oncoming vehicles M1 and M2 in the lateral direction relative to the own vehicle M0.

That is, when the distances in the lateral direction between the own vehicle M0 and the oncoming vehicles M1 and M2 become shorter over time, the oncoming vehicles M1 and M2 can be determined to be turning vehicles. Here, the turning vehicle refers to a right-turning vehicle, when driving is performed on the left-hand side of the road, or a left-turning vehicle, when driving is performed on the right-hand side of the road, that advances so as to intersect with an advancing course of the own vehicle M0.

When determined that the oncoming vehicle M1 is unlikely to stop, that is, the oncoming vehicle M1 is merely a turning vehicle (No at step S116), the CPU 101 sets a third threshold T3 (s) as the determination threshold Tb (step S118) and proceeds to step S122. For example, whether the oncoming vehicle M1 is likely to stop is determined based on whether the relative speed of the oncoming vehicle M1 relative to the own vehicle M0 decreases over time, that is, the oncoming vehicle M1 is decelerating, or whether the vehicle speed of the oncoming vehicle M1 is 0 km/h.

When the relative speed of the oncoming vehicle M1 relative to the own vehicle M0 decreases over time, the CPU 101 determines that the oncoming vehicle M1 is likely to stop. When the vehicle speed of the oncoming vehicle M1 is already 0 km/h, as well, the CPU 101 determines that the oncoming vehicle M1 is likely to stop. The third timing is a brake timing that is later than the second brake timing, that is, a brake timing of which the brake start timing is later in time than the second brake timing.

When the own vehicle M0 is advancing inside the intersection IS and the oncoming vehicle M1 is a turning vehicle, the own vehicle M1 and the oncoming vehicle M1 become closer over time, and the vehicle speed of the turning vehicle tends to decrease. Therefore, as a result of the start timing for brake assistance being delayed, the execution of brake assistance is suppressed. Reduction of discomfort experienced by the passenger is achieved. The third threshold T3 that corresponds to the third brake timing has a relationship T3<T2 with the second threshold T2.

When determined that the oncoming vehicle M1 is likely to stop, that is, the oncoming vehicle M1 is a turning vehicle that stops inside the intersection to make a right turn (Yes at step S116), the CPU 101 sets a fourth threshold T4 (s) that indicates a fourth brake timing as the determination threshold Tb (step S120) and proceeds to step S122. The fourth brake timing is a brake timing that is later than the third brake timing, that is, a brake timing of which the brake start timing is later in terms of time than the third brake timing.

When the oncoming vehicle M1 is a turning vehicle that temporarily stops inside the intersection, the own vehicle M0 and the oncoming vehicle M1 become nearest to each other. However, the turning vehicle stops. Therefore, as a result of the start timing for brake assistance being delayed, the execution of brake assistance is suppressed. Reduction of discomfort experienced by the passenger is achieved. The fourth threshold T4 that corresponds to the fourth brake timing has a relationship T4<T3 with the third threshold T3. Here, instead of the setting of the fourth threshold T4, a setting in which brake assistance itself is not performed may be made.

The CPU 101 determines the collision predicted time TTC of the own vehicle M0 relative to the oncoming vehicles M1 and M2, and determines whether a relationship TTC≤Tb is established, that is, whether to avoid contact or collision with the oncoming vehicles M1 and M2 by starting the braking of the own vehicle M0 (step S122). When determined that the relationship TTC≤Tb is not established (No at step S122), the CPU 101 ends the present processing routine and starts the present processing routine at the next execution timing.

When determined that the relationship TTC≤Tb is established (Yes at step S122), the CPU 101 performs brake assistance (step S124) and ends the present processing routine. Specifically, the CPU 101 transmits a control signal that commands increase in the brake fluid pressure to the brake assistance actuator 30 and performs braking by operating the brake apparatus 502. For example, brake assistance is ended by the CPU 101 detecting a complete stop of the own vehicle M0, that is, a vehicle speed of 0 km/h through the wheel speed sensor 24, or by the relationship TTC≤Tb being established.

As a result of the above-described brake assistance apparatus 10 and brake assistance control method according to the first embodiment, the brake timing for brake assistance is determined based on the state surrounding the own vehicle M0. Therefore, accuracy regarding the avoidance of contact or collision between the own vehicle M0 that is advancing straight ahead at an intersection and another vehicle, and accuracy in mitigating the effects that accompany collision or contact can be improved.

Specifically, the determination threshold Tb is set based on whether the own vehicle M0 is present inside the intersection IS or, when the own vehicle M0 is present inside the intersection IS, a determination regarding whether an oncoming vehicle is a straight-advancing vehicle or a turning vehicle and a determination regarding whether the oncoming vehicle is likely to stop when the oncoming vehicle is a turning vehicle. Therefore, when the own vehicle M0 is advancing straight ahead at the intersection IS, an execution timing for brake assistance can be accurately set based on the attribute regarding whether the oncoming vehicle is a straight-advancing vehicle or a turning vehicle.

In addition, the execution timing for brake assistance can be further delayed when the attribute of the oncoming vehicle that is a turning vehicle is that the oncoming vehicle is likely to stop. As a result, the timing at which the execution of brake assistance is required can be accurately set to timings of three stages based on the attributes of the oncoming vehicle at the intersection IS. The frequency of the execution of brake assistance inside an intersection can be reduced. In addition, accuracy regarding the avoidance of contact or collision with the oncoming vehicle, and accuracy in mitigating the effects, such as damage, that accompany collision or contact can be improved.

Second Embodiment

A brake assistance apparatus according to a second embodiment will be described with reference to FIG. 6. The brake assistance apparatus according to the second embodiment includes configurations and processes that are similar to those of the brake assistance apparatus 10 according to the first embodiment, aside from differences in the attributes of the oncoming vehicle that are used for brake assistance. Specifically, according to the second embodiment, whether the own vehicle M0 is present inside the intersection IS is determined.

When the own vehicle M0 is determined to be present inside the intersection, the determination threshold Tb is set based on a determination regarding whether the oncoming vehicle is likely to stop. The brake assistance apparatus according to the second embodiment differs from the brake assistance apparatus 10 according to the first embodiment in that the determination regarding whether the oncoming vehicle is a straight-advancing vehicle or a turning vehicle is not performed.

Therefore, configurations and processes that are identical to those of the brake assistance apparatus 10 according to the first embodiment are given the same reference numbers and step numbers that are used according to the first embodiment. Descriptions thereof are omitted. Differing processing steps are described below.

A processing routine shown in FIG. 6 is repeatedly performed by the CPU 101 running the brake assistance control program P1, at a predetermined time interval from when the control system of the vehicle is started until when the control system is stopped or from when the start switch is turned on until the start switch is turned off. Here, the brake assistance control program P1 includes the processing steps of step S121a to step S121c instead of step S112 to step S120 according to the first embodiment.

The CPU 101 performs steps S100 to S108. When determined that the own vehicle M0 is present inside the intersection IS at step S108 (Yes at step S108), the CPU 101 determines whether the oncoming vehicle is likely to stop (step S121a). The method for determining whether the oncoming vehicle is likely to stop is as described according to the first embodiment. When determined that the oncoming vehicle is not likely to stop (No at step S121a), the CPU 101 sets the second threshold T2 (s) that indicates the second brake timing as the determination threshold Tb (step S121b) and proceeds to step S122.

As described above, the second threshold T2 has a relationship T2<T1 with the first threshold T1. The execution of brake assistance is suppressed by the start timing for brake assistance being delayed. Reduction of discomfort experienced by the passenger is achieved. Here, the third threshold T3 (s) that is less than the second threshold T2 may be used instead of the second threshold T2.

When the own vehicle M0 is advancing inside the intersection IS, the likelihood of collision or contact is low when the oncoming vehicle is a straight-advancing vehicle (M2). In addition, when the oncoming vehicle is a turning vehicle (M1), the vehicle speed of the turning vehicle tends to decelerate. Therefore, through use of a threshold that is based on the turning vehicle, the start timing for brake assistance can be further delayed and the execution of brake assistance can be suppressed. Reduction of discomfort experienced by the passenger can be further achieved.

When determined that the oncoming vehicle is likely to stop (Yes at step S121a), the CPU 101 sets the fourth threshold T4 (s) that indicates the fourth brake timing as the determination threshold Tb (step S121c) and proceeds to step S122. The fourth brake timing is a brake timing that is later than the second brake timing. The fourth threshold T4 that corresponds to the fourth brake timing has a relationship T4<T2 with the second threshold.

When the oncoming vehicle is likely to temporarily stop inside the intersection, the likelihood of the oncoming vehicle being a turning vehicle (M1) is high. While the oncoming vehicle becomes nearest to the own vehicle M0, the oncoming vehicle stops. Therefore, as a result of the start timing for brake assistance being further delayed, the execution of brake assistance is suppressed. Reduction of discomfort experienced by the passenger is achieved. Here, instead of the setting of the fourth threshold T4, a setting in which brake assistance itself is not performed may be made.

As a result of the above-described brake assistance apparatus 10 and brake assistance control method according to the second embodiment, the brake timing for brake assistance is determined based on the state surrounding the own vehicle M0. Therefore, accuracy regarding the avoidance of contact or collision between the own vehicle M0 that is advancing straight ahead at an intersection and another vehicle, and accuracy in mitigating the effects that accompany collision or contact can be improved. Specifically, the determination threshold Tb is set based on whether the own vehicle M0 is present inside the intersection IS or, when the own vehicle M0 is present inside the intersection IS, a determination regarding whether the oncoming vehicle is likely to stop when the oncoming vehicle is a turning vehicle.

Therefore, when the own vehicle M0 is advancing straight ahead at the intersection IS, the execution timing for brake assistance can be delayed independent of the attributes of the oncoming vehicle. When the attributes of the oncoming vehicle indicate that the oncoming vehicle is likely to stop, the execution timing for brake assistance can be further delayed. As a result, the timing at which the execution of brake assistance is required at the intersection IS can be accurately set. The frequency of the execution of brake assistance inside an intersection can be reduced. In addition, contact or collision with an oncoming vehicle can be avoided.

Variation Examples (1) According to the first and second embodiments, the attributes of the target are determined through use of the detection signals or image data from the millimeter-wave radars 21 and 21s, the monocular camera 22, or the LIDAR and the stereo camera that serve as the target detecting unit. In this regard, when the target is an oncoming vehicle, the attributes of the oncoming vehicles M1 and M2 may be determined through use of data, such as steering angle, accelerator position, or brake operation amount, related to the behavior of the other vehicle that is acquired through an inter-vehicle communication system.

(2) According to the first and second embodiments, only the execution of braking of the own vehicle M0 through the brake apparatus 502 is performed as the execution of brake assistance. However, notification of the execution of brake assistance, that is, notification that collision avoidance is necessary may be performed before the execution of braking. Alternatively, only notification of brake assistance may be performed as brake assistance.

(3) According to the second embodiment, whether the oncoming vehicle is a straight-advancing vehicle or a turning vehicle is not determined. However, after the oncoming vehicle is determined to not be likely to stop, whether the oncoming vehicle is a straight-advancing vehicle or a turning vehicle may be determined. When the oncoming vehicle is determined to be a straight-advancing vehicle, the second threshold T2 may be used. When the oncoming vehicle is determined to be a turning vehicle, the third threshold T3 may be used.

(4) According to the first embodiment and the second embodiment, the start timing for the execution of brake assistance is changed based on the state surrounding the own vehicle, that is, the road environment in which the own vehicle is present and the attributes of an oncoming vehicle. However, in addition, a level of brake assistance, such as braking force, may be changed. As an example of changes in braking force, the setting may be such that a braking level is increased as a threshold Tx decreases, and collision or contact with an oncoming vehicle can be sufficiently avoided during execution of brake assistance.

(5) According to the first embodiment and the second embodiment, as a result of the CPU 101 running the brake assistance control program P1, the brake assistance control unit is actualized by software. However, the brake assistance control unit may be actualized by hardware through an integrated circuit or a discrete circuit that is programed in advance.

The present disclosure is described above based on the embodiments and variation examples. However, the above-described embodiments are provided to facilitate understanding of the present disclosure and do not limit the present disclosure. The present disclosure can be modified and improved without departing from the spirit and scope of claims of the disclosure.

In addition, the present disclosure includes equivalents thereof. For example, embodiments that correspond to technical features in each aspect described in the summary of the invention and technical features in the variation examples can be replaced and combined as appropriate to solve some or all of the above-described issued or to achieve some or all of the above-described effects. Furthermore, the technical features may be omitted as appropriate unless described as a requisite in the present specification.

For example, giving the above-described brake assistance apparatus for a vehicle according to the first embodiment as modification 1, the following modifications may be provided.

Modification 2: The brake assistance apparatus for a vehicle described in modification 1, wherein the brake assistance control unit performs the brake assistance at the second brake timing or does not perform brake assistance in response to an oncoming vehicle detected by the detecting unit being a straight-advancing vehicle.

Modification 3: The brake assistance apparatus for a vehicle described in modification 1 or 2, wherein the brake assistance control unit performs the brake assistance at a third brake timing that is later than the second brake timing in response to the detected oncoming vehicle being a turning vehicle that is advancing so as to intersect an own traffic lane.

Modification 4: The brake assistance apparatus for a vehicle described in modification 3, wherein the brake assistance control unit performs the brake assistance at a fourth brake timing that is later than the third brake timing or does not perform brake assistance in response to the detected oncoming vehicle being likely to stop.

Modification 5: The brake assistance apparatus for a vehicle described in modification 1, wherein the brake assistance control unit performs the brake assistance at the second brake timing or a third brake timing that is later than the second brake timing in response to an oncoming vehicle detected by the detecting unit not being likely to stop.

Modification 6: The brake assistance apparatus for a vehicle described in modification 1 or 5, wherein the brake assistance control unit performs the brake assistance at a fourth brake timing that is later than the second brake timing or does not perform the brake assistance in response to an oncoming vehicle detected by the detecting unit being likely to stop.

What is claimed is:

1. A brake assistance apparatus for a vehicle, comprising:
a processor,
a non-transitory computer-readable storage medium; and
a set of computer-executable instructions stored on the non-transitory computer-readable storage medium that cause the processor to:
acquire attributes regarding a detected state surrounding an own vehicle; and
determine whether the own vehicle is advancing at an intersection based on the detected state surrounding the own vehicle,
perform brake assistance to brake the own vehicle at a first brake timing, in response to the own vehicle being determined not to be advancing at the intersection based on the detected state surrounding the own vehicle, wherein the first brake timing is a timing at which the brake assistance is started for avoiding a collision with a detected target or mitigating damage due to contact, and
perform the brake assistance to brake the own vehicle at a second brake timing that is later in start time of the brake assistance than the first brake timing, in response to the own vehicle being determined to be advancing at the intersection based on the detected state surrounding the own vehicle.

2. The brake assistance apparatus for a vehicle according to claim 1, wherein:
the set of computer-executable instructions further cause the processor to:
in response to the own vehicle being determined to be advancing at the intersection based on the detected state surrounding the own vehicle, determine whether a detected oncoming vehicle is a straight-advancing vehicle; and
perform the brake assistance at the second brake timing or does not perform the brake assistance in response to the detected oncoming vehicle being determined to be a straight-advancing vehicle.

3. The brake assistance apparatus for a vehicle according to claim 2, wherein:
the set of computer-executable instructions further cause the processor to:
in response to the own vehicle being determined be advancing at the intersection based on the detected state surrounding the own vehicle, determine whether a detected oncoming vehicle is a turning vehicle that is advancing so as to intersect an own traffic lane on which the own vehicle is travelling; and
perform the brake assistance at a third brake timing that is later in start time of the brake assistance than the second brake timing in response to the detected oncoming vehicle being determined to be the turning vehicle that is advancing so as to intersect the own traffic lane.

4. The brake assistance apparatus for a vehicle according to claim 3, wherein:
the set of computer-executable instructions further cause the processor to:
in response to the own vehicle being determined to be advancing at the intersection based on the detected state surrounding the own vehicle, determine whether a detected oncoming vehicle is likely to stop; and
perform the brake assistance at a fourth timing that is later in start time of the brake assistance than the third brake timing or does not perform brake assistance in response to the detected oncoming vehicle being determined to be likely to stop.

5. The brake assistance apparatus for a vehicle according to claim 1, wherein:
the set of computer-executable instructions further cause the processor to:
in response to the own vehicle being determined to be advancing at the intersection based on the detected state surrounding the own vehicle, determine whether a detected oncoming vehicle is a turning vehicle that is advancing so as to intersect an own traffic lane on which the own vehicle is travelling; and
perform the brake assistance at a third brake timing that is later in start time of the brake assistance than the second brake timing in response to the detected oncoming vehicle being determined to be the turning vehicle that is advancing so as to intersect the own traffic lane.

6. The brake assistance apparatus for a vehicle according to claim 5, wherein:
the set of computer-executable instructions further cause the processor to:
in response to the own vehicle being determined to be advancing at the intersection based on the detected state surrounding the own vehicle, determine whether a detected oncoming vehicle is likely to stop; and
perform the brake assistance at a fourth timing that is later in start time of the brake assistance than the third brake timing or does not perform brake assistance in response to the detected oncoming vehicle being determined to be likely to stop.

7. The brake assistance apparatus for a vehicle according to claim 1, wherein:
the set of computer-executable instructions further cause the processor to:
in response to the own vehicle being determined to be advancing at the intersection based on the detected state surrounding the own vehicle, determine whether a detected oncoming vehicle is likely to stop; and
perform the brake assistance at the second brake timing or a third brake timing that is later in start time of the brake assistance than the second brake timing in response to the detected oncoming vehicle being determined not to be likely to stop.

8. The brake assistance apparatus for a vehicle according to claim 7, wherein:
the set of computer-executable instructions further cause the processor to:
in response to the own vehicle being determined to be advancing at the intersection based on the detected state surrounding the own vehicle, determine whether a detected oncoming vehicle is likely to stop; and
perform the brake assistance at a fourth brake timing that is later in start time of the brake assistance than the second brake timing or does not perform the brake assistance in response to the detected oncoming vehicle being determined to be likely to stop.

9. The brake assistance apparatus for a vehicle according to claim 1, wherein:
the set of computer-executable instructions further cause the processor to:
in response to the own vehicle being determined to be advancing at the intersection based on the detected state surrounding the own vehicle, determine whether a detected oncoming vehicle is likely to stop; and
perform the brake assistance at a fourth brake timing that is later in start time of the brake assistance than the second brake timing or does not perform brake assistance not the detected oncoming vehicle being determined not to be likely to stop.

10. A brake assistance control method for a vehicle, comprising:
detecting a state surrounding an own vehicle;
determining whether the own vehicle is advancing at an intersection based on the detected state surrounding the own vehicle;
performing the brake assistance to brake the own vehicle at a first brake timing, in response to the own vehicle being determined not to be advancing at the intersection based on the detected state surrounding the own vehicle, wherein the first brake timing is a timing at which the brake assistance is started for avoiding a collision with a detected target or mitigating damage due to contact; and
performing the brake assistance to brake the own vehicle at a second brake timing that is later in start time of the brake assistance than the first brake timing, in response to the own vehicle being determined to be advancing at an intersection based on the detected state surrounding the own vehicle.

* * * * *